(12) United States Patent
Yu et al.

(10) Patent No.: US 8,908,121 B2
(45) Date of Patent: Dec. 9, 2014

(54) SLIM BEZEL LIQUID CRYSTAL DISPLAY DEVICE

(71) Applicant: Shenzhen China Star Optoelectronics Technology Co., Ltd., Shenzhen, Guangdong (CN)

(72) Inventors: Gang Yu, Shenzhen (CN); Liuyang Yang, Shenzhen (CN)

(73) Assignee: Shenzhen China Star Optoelectronics Technology, Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/704,233

(22) PCT Filed: Oct. 26, 2012

(86) PCT No.: PCT/CN2012/083531
§ 371 (c)(1),
(2), (4) Date: Dec. 13, 2012

(87) PCT Pub. No.: WO2014/059691
PCT Pub. Date: Apr. 24, 2014

(65) Prior Publication Data
US 2014/0104536 A1    Apr. 17, 2014

(30) Foreign Application Priority Data
Oct. 17, 2012  (CN) .......................... 2012 1 0395152

(51) Int. Cl.
G02F 1/1333    (2006.01)
(52) U.S. Cl.
CPC .............................. *G02F 1/133308* (2013.01)
USPC .......................................................... 349/58

(58) Field of Classification Search
USPC ............................................................ 349/58
See application file for complete search history.

(56) References Cited

U.S. PATENT DOCUMENTS

| | | | |
|---|---|---|---|
| 7,911,775 B2 * | 3/2011 | Azami | ................ 361/679.21 |
| 2002/0159001 A1 * | 10/2002 | Kim | ........................ 349/58 |
| 2009/0122217 A1 | 5/2009 | Chen et al. | |
| 2012/0063074 A1 | 3/2012 | Matsuda et al. | |

FOREIGN PATENT DOCUMENTS

| | | |
|---|---|---|
| CN | 201259594 Y | 6/2009 |
| CN | 101583900 A | 11/2009 |
| CN | 201435743 Y | 3/2010 |
| CN | 102081259 A | 6/2011 |
| CN | 201897928 U | 7/2011 |
| CN | 102368122 A | 3/2012 |

* cited by examiner

*Primary Examiner* — Lucy Chien
(74) *Attorney, Agent, or Firm* — Andrew C. Cheng

(57) ABSTRACT

The present invention provides a slim bezel liquid crystal display device, which includes a rear enclosure, a front enclosure mating the rear enclosure, and a liquid crystal display module arranged in the rear enclosure. The liquid crystal display module is fixed inside the rear enclosure by means of hook-and-loop fasteners. The hook-and-loop fasteners each include a first fastening section and a second fastening section. The first fastening section includes hooks and the second fastening section includes hoops, whereby the hooks of the first fastening section are entangleable with the loops of the second fastening section to have the first and second fastening sections coupled to each other thereby fixing the liquid crystal display module in the rear enclosure. The slim bezel liquid crystal display device uses hook-and-loop fasteners to fix the liquid crystal display module in the rear enclosure. The structure is simple and the assembling operation is easy.

6 Claims, 4 Drawing Sheets

SLIM BEZEL LIQUID CRYSTAL DISPLAY DEVICE

BACKGROUND OF THE INVENTION

1. Field of the Invention

The present invention relates to the field of liquid crystal displaying, and in particular to a slim bezel liquid crystal display device.

2. The Related Arts

Liquid crystal display (LCD) has numerous advantages, such as thin device body, less power consumption, and being free of radiation, and is thus widely used. Most of the liquid crystal display devices that are available in the market are backlighting liquid crystal displays, which comprise a liquid crystal display panel and a backlight module. The operation principle of the liquid crystal display panel is that liquid crystal molecules are arranged between two parallel glass substrates and electricity is selectively applied to the glass substrates to cause change of the orientation of the liquid crystal molecules in order to refract out the light from a backlight module for formation of an image.

A conventional liquid crystal display device generally comprises a rear enclosure, a front enclosure that mates the rear enclosure and a liquid crystal display module arranged in the rear enclosure. The liquid crystal display module is often fixed inside the rear enclosure by being screwed from the front side to the rear side. And then, the front enclosure is fit to the rear enclosure. Referring to FIG. 1, a schematic view is given to show an assembling structure of a conventional liquid crystal display module, which comprises an outer frame 100 forming bolt mounting zones 300. The bolt mounting zones 300 form bolt holes 500 and bolts are received through the bolt holes 500 to fix the liquid crystal display module in the rear enclosure. Due to the arrangement of the bolt mounting zones 300, the front enclosure needs a wide bezel to cover the bolt mounting zones 300. Consequently, a non-display zone of the liquid crystal display device is expanded. Further, since the manner of fixing is done by screwing from the front side to the rear side, the thickness of the liquid crystal display device is thus increased. With the constant progress of the manufacturing techniques of liquid crystal display device, the trend of development of liquid crystal display device is now toward bezel slimming and device thinning. The manner of fixing the liquid crystal display module to the rear enclosure affects the bezel width and overall thickness of the liquid crystal display device to quite an extent.

SUMMARY OF THE INVENTION

An object of the present invention is to provide a slim bezel liquid crystal display device, which has a simple structure, is easy to maintain, can effectively realize bezel slimming and device thinning of the liquid crystal display device, and is capable of effectively controlling maintenance cost.

To achieve the object, the present invention provides a slim bezel liquid crystal display device, which comprises a rear enclosure, a front enclosure mating the rear enclosure, and a liquid crystal display module arranged in the rear enclosure. The liquid crystal display module is fixed inside the rear enclosure by means of hook-and-loop fasteners. The hook-and-loop fasteners each comprise a first fastening section and a second fastening section. The first fastening section comprises hooks and the second fastening section comprises hoops, whereby the hooks of the first fastening section are entangleable with the loops of the second fastening section to have the first and second fastening sections coupled to each other thereby fixing the liquid crystal display module in the rear enclosure.

The liquid crystal display module comprises a back frame and a liquid crystal display panel received in the back frame.

The rear enclosure comprises a bottom board and side boards connected to the bottom board.

The first fastening sections of the hook-and-loop fasteners are attached to bottom of the back frame and the second fastening sections are attached to an inside surface of the bottom board to respectively correspond to the first fastening sections.

The hook-and-loop fasteners are of a number of two.

The first and second fastening sections of the hook-and-loop fasteners are attached to sides of the back frame of the liquid crystal display module and the side boards of the rear enclosure.

The hook-and-loop fasteners are of a number of four.

The liquid crystal display module further comprises a backlight module arranged inside the back frame. The backlight module provides a uniformly distributed planar light source to the liquid crystal display panel.

The present invention also provides a slim bezel liquid crystal display device, which comprises a rear enclosure, a front enclosure mating the rear enclosure, and a liquid crystal display module arranged in the rear enclosure, the liquid crystal display module being fixed inside the rear enclosure by means of hook-and-loop fasteners, the hook-and-loop fasteners each comprising a first fastening section and a second fastening section, the first fastening section comprising hooks and the second fastening section comprising hoops, whereby the hooks of the first fastening section are entangleable with the loops of the second fastening section to have the first and second fastening sections coupled to each other thereby fixing the liquid crystal display module in the rear enclosure;

wherein the liquid crystal display module comprises a back frame and a liquid crystal display panel received in the back frame;

wherein the rear enclosure comprises a bottom board and side boards connected to the bottom board;

wherein the first fastening sections of the hook-and-loop fasteners are attached to bottom of the back frame and the second fastening sections are attached to an inside surface of the bottom board to respectively correspond to the first fastening sections;

wherein the hook-and-loop fasteners are of a number of two; and wherein the liquid crystal display module further comprises a backlight module arranged inside the back frame, the backlight module providing a uniformly distributed planar light source to the liquid crystal display panel.

The efficacy of the present invention is that the present invention provides a slim bezel liquid crystal display device that comprises hook-and-loop fasteners to fix the liquid crystal display module in the rear enclosure. The structure is simple and the assembling operation is easy so as to effectively achieve bezel slimming and device thinning of a liquid crystal display device. Further, easy disassembling can be done with the liquid crystal display module in case of maintenance and replacement so that the maintenance cost can be effectively controlled.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
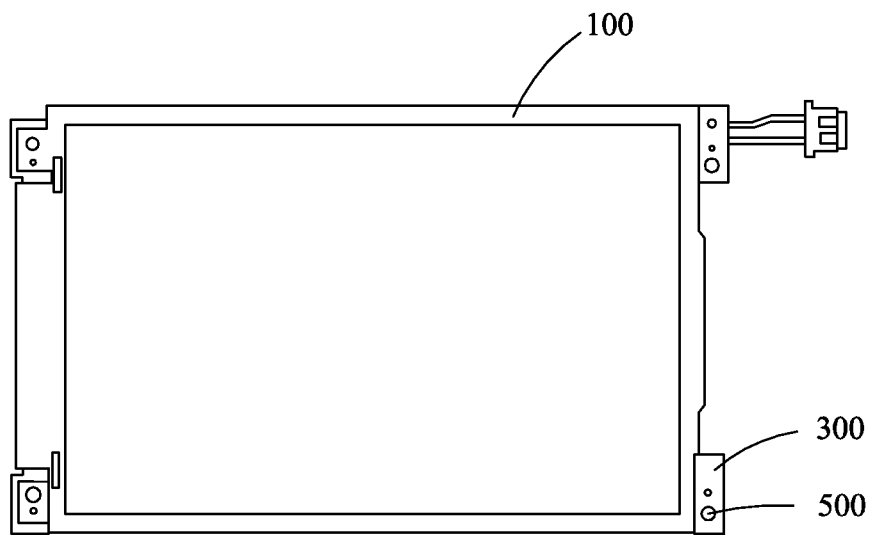
FIG. 1 is a schematic view showing an assembled structure of a conventional liquid crystal display module.
Figure 2:
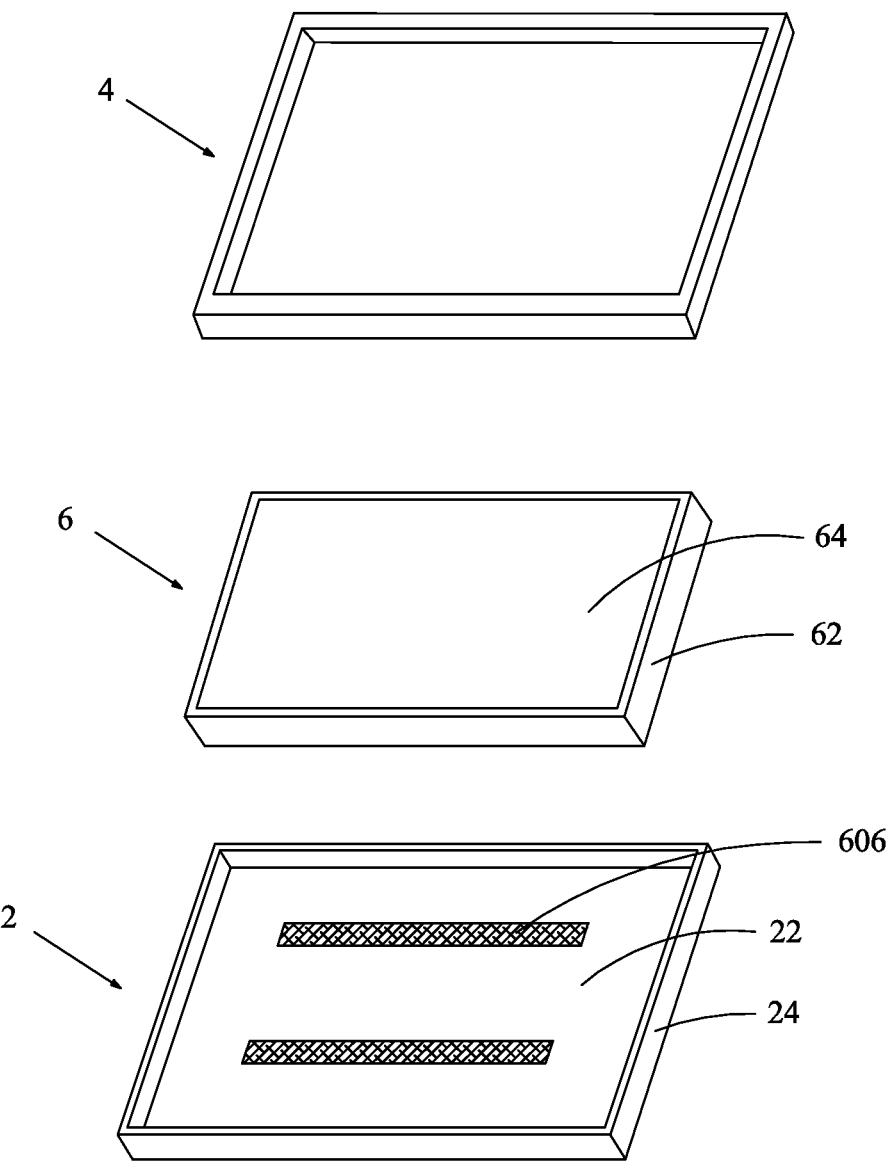
FIG. 2 is an exploded view showing a slim bezel liquid crystal display device according to a preferred embodiment of the present invention.
Figure 3:
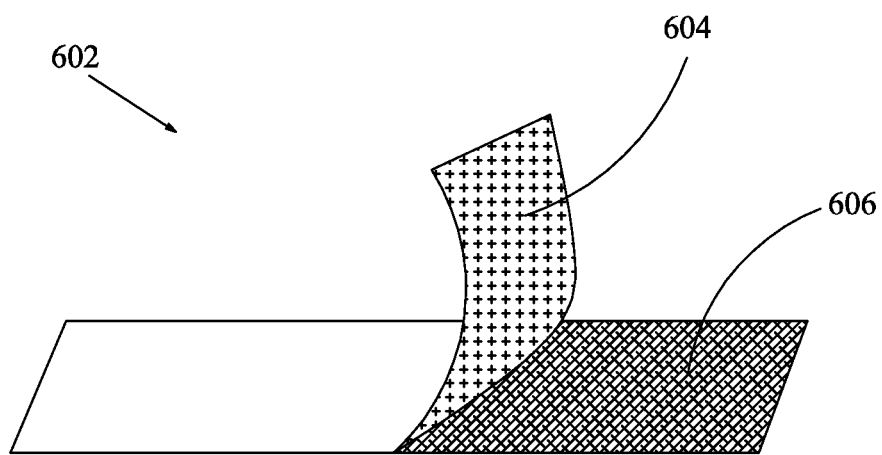
FIG. 3 is a schematic view showing the structure of a hook-and-loop fastener of FIG. 2.

Referring to FIGS. 2 and 3, the present invention provides a slim bezel liquid crystal display device, which comprises a rear enclosure 2, a front enclosure 4 mating the rear enclosure 2, and a liquid crystal display module 6 arranged inside the rear enclosure 2. The liquid crystal display module 6 is fixed inside the rear enclosure 2 by means of hook-and-loop fasteners 602.

The hook-and-loop fasteners 602 are each composed of a first fastening section 604 and a second fastening section 606. The first fastening section 604 is attached to a back surface of the liquid crystal display module 6, while the second fastening section 606 is mounted inside the rear enclosure 2. The first fastening section 604 comprises hooks and the second fastening section 606 comprises hoops, whereby the hooks of the first fastening section 604 are entangleable with the loops of the second fastening section 606 to have the first and second fastening sections 604, 606 coupled to each other thereby fixing the liquid crystal display module 6 in the rear enclosure 2. The first and second fastening sections 604, 606 can only be separated when a relatively large pulling force is applied thereto. In the instant embodiment, two hook-and-loop fasteners 602 are set in lateral direction to fix the liquid crystal display module 6 in the rear enclosure 2.

The liquid crystal display module 6 comprises a back frame 62 and a liquid crystal display panel 64 received in the back frame 62. The first fastening sections 604 of the hook-and-loop fasteners 602 are attached to bottom of the back frame 62. The rear enclosure 2 comprises a bottom board 22 and side boards 24 formed on the bottom board. The second fastening sections 606 are attached to an inside surface of the bottom board 22 to respectively correspond to the first fastening sections 604.

The liquid crystal display module 6 further comprises a backlight module (not shown) arranged inside the back frame 62. The backlight module provides a uniformly distributed planar light source to the liquid crystal display panel 64 to ensure normal operation of the liquid crystal display module 6.

Figure 4:
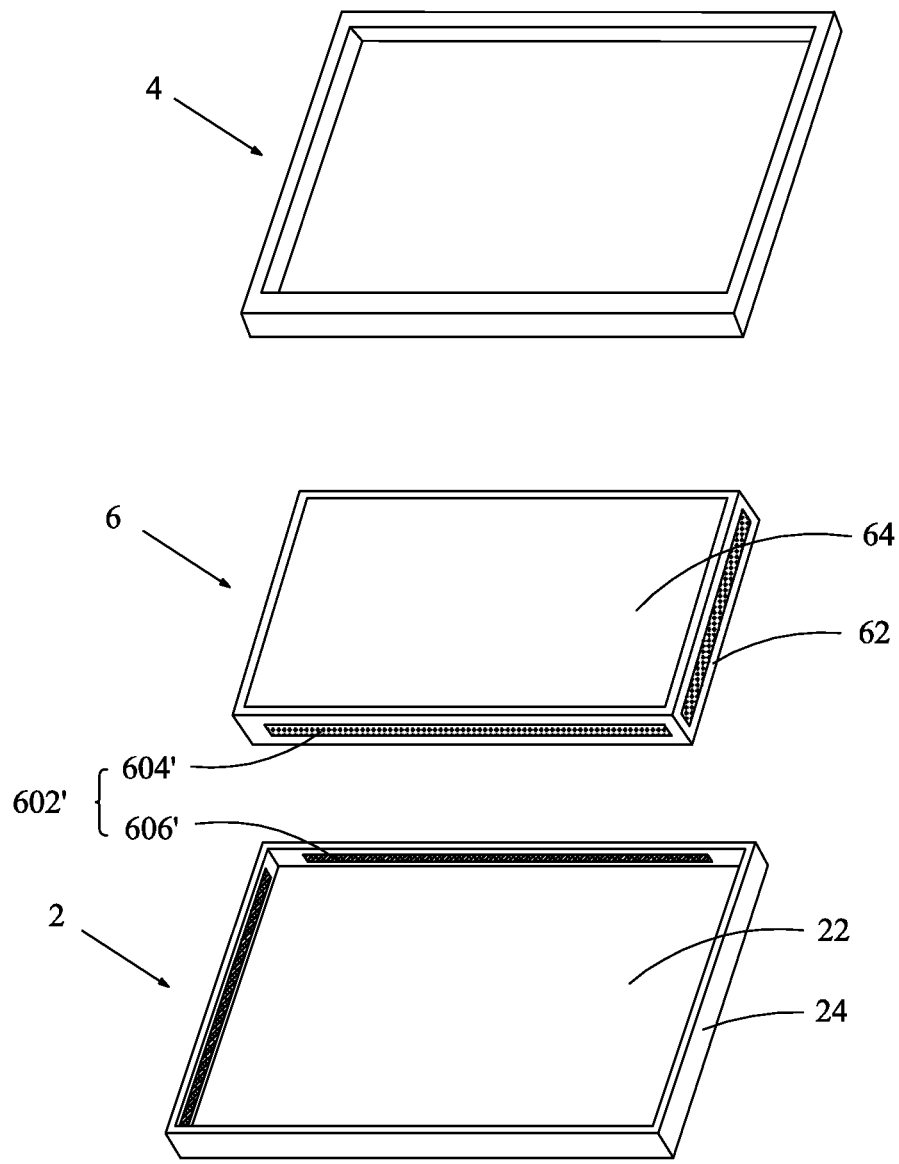
FIG. 4 is an exploded view showing a slim bezel liquid crystal display device according to another preferred embodiment of the present invention.

Referring to FIG. 4, the first and second fastening sections 604', 606' of the hook-and-loop fasteners 602' may be alternatively attached to sides of the back frame 62 of the liquid crystal display module 6 and the side boards 24 of the rear enclosure 2. This arrangement can equally effectively fix the liquid crystal display module 6 in the rear enclosure 2. In this embodiment, four hook-and-loop fasteners 602' are provided to respectively fix four sides of the liquid crystal display module 6.

In summary, the present invention provides a slim bezel liquid crystal display device that comprises hook-and-loop fasteners to fix the liquid crystal display module in the rear enclosure. The structure is simple and the assembling operation is easy so as to effectively achieve bezel slimming and device thinning of a liquid crystal display device. Further, easy disassembling can be done with the liquid crystal display module in case of maintenance and replacement so that the maintenance cost can be effectively controlled.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A slim bezel liquid crystal display device, comprising a rear enclosure, a front enclosure mating the rear enclosure, and a liquid crystal display module arranged in the rear enclosure, the liquid crystal display module being fixed inside the rear enclosure by means of hook-and-loop fasteners, the hook-and-loop fasteners each comprising a first fastening section and a second fastening section, the first fastening section comprising hooks and the second fastening section comprising hoops, whereby the hooks of the first fastening section are entangleable with the loops of the second fastening section to have the first and second fastening sections coupled to each other thereby fixing the liquid crystal display module in the rear enclosure;

wherein the liquid crystal display module comprises a back frame and a liquid crystal display panel received in the back frame;

wherein the rear enclosure comprises a bottom board and side boards connected to the bottom board; and wherein the first fastening sections of the hook-and-loop fasteners are attached to bottom of the back frame and the second fastening sections are attached to an inside surface of the bottom board to respectively correspond to the first fastening sections.

2. The slim bezel liquid crystal display device as claimed in 1, wherein the hook-and-loop fasteners are of a number of two.

3. A slim bezel liquid crystal display device, comprising a rear enclosure, a front enclosure mating the rear enclosure, and a liquid crystal display module arranged in the rear enclosure, the liquid crystal display module being fixed inside the rear enclosure by means of hook-and-loop fasteners, the hook-and-loop fasteners each comprising a first fastening section and a second fastening section, the first fastening section comprising hooks and the second fastening section comprising hoops, whereby the hooks of the first fastening section are entangleable with the loops of the second fastening section to have the first and second fastening sections coupled to each other thereby fixing the liquid crystal display module in the rear enclosure;

wherein the liquid crystal display module comprises a back frame and a liquid crystal display panel received in the back frame;

wherein the rear enclosure comprises a bottom board and side boards connected to the bottom board; and wherein the first and second fastening sections of the hook-and-loop fasteners are attached to sides of the back frame of the liquid crystal display module and the side boards of the rear enclosure.

4. The slim bezel liquid crystal display device as claimed in claim 3, wherein the hook-and-loop fasteners are of a number of four.

5. The slim bezel liquid crystal display device as claimed in claim 1, wherein the liquid crystal display module further comprises a backlight module arranged inside the back frame, the backlight module providing a uniformly distributed planar light source to the liquid crystal display panel.

6. A slim bezel liquid crystal display device, comprising a rear enclosure, a front enclosure mating the rear enclosure, and a liquid crystal display module arranged in the rear enclosure, the liquid crystal display module being fixed inside the rear enclosure by means of hook-and-loop fasteners, the hook-and-loop fasteners each comprising a first fastening section and a second fastening section, the first fastening section comprising hooks and the second fastening section comprising hoops, whereby the hooks of the first fastening section are entangleable with the loops of the second fastening section to have the first and second fastening sections coupled to each other thereby fixing the liquid crystal display module in the rear enclosure;

wherein the liquid crystal display module comprises a back frame and a liquid crystal display panel received in the back frame;

wherein the rear enclosure comprises a bottom board and side boards connected to the bottom board;

wherein the first fastening sections of the hook-and-loop fasteners are attached to bottom of the back frame and the second fastening sections are attached to an inside surface of the bottom board to respectively correspond to the first fastening sections;

wherein the hook-and-loop fasteners are of a number of two; and wherein the liquid crystal display module further comprises a backlight module arranged inside the back frame, the backlight module providing a uniformly distributed planar light source to the liquid crystal display panel.

\* \* \* \* \*